United States Patent Office 3,066,767
Patented Dec. 4, 1962

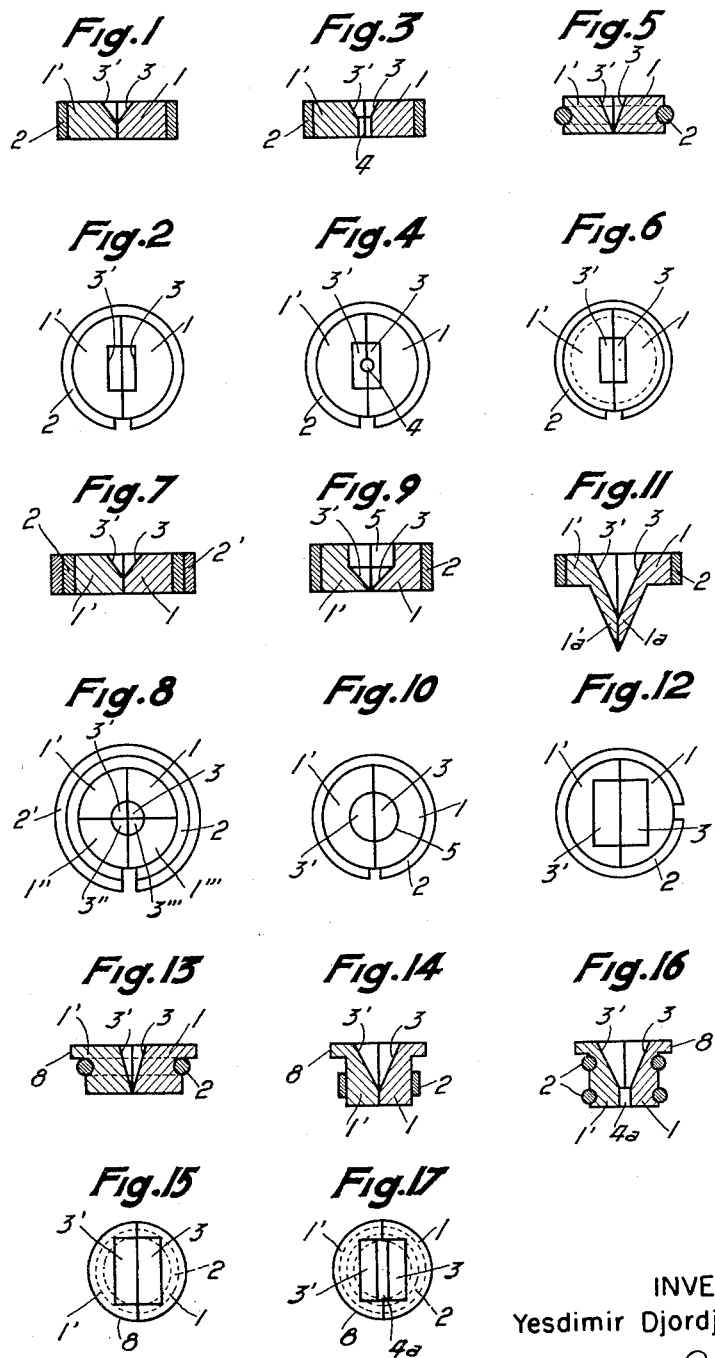

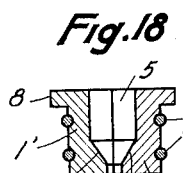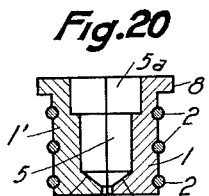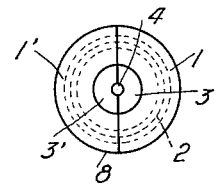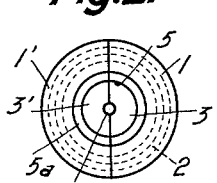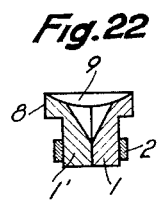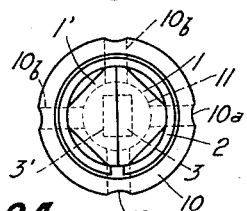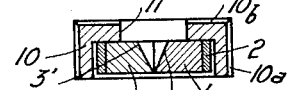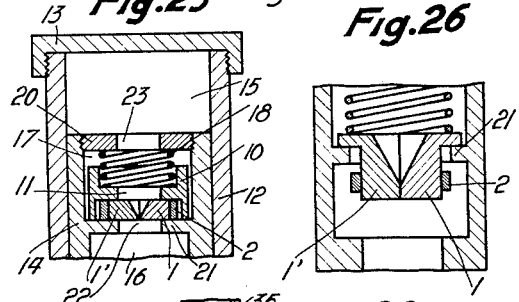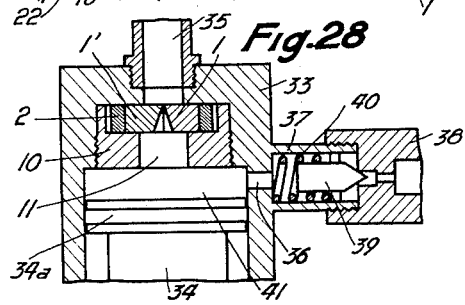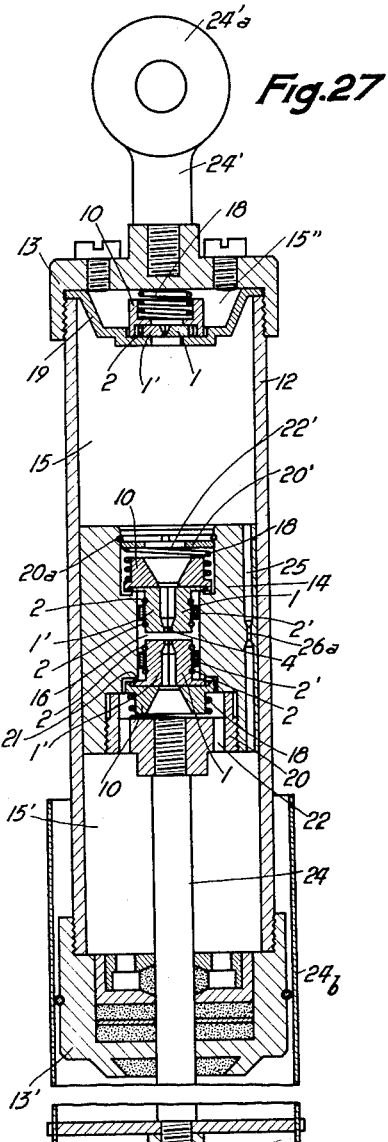

3,066,767
SHOCK ABSORBER
Yesdimir Djordjevitch, 107 Faubourg Bonnefoy,
Toulouse, France
Continuation of abandoned application Ser. No. 426,249,
Apr. 28, 1954. This application Nov. 25, 1958, Ser.
No. 776,278
2 Claims. (Cl. 188—88)

My present application is a continuation of my copending application Serial No. 426,249 filed on April 28, 1954, now abandoned.

The invention relates to improvements in valve devices for shock-absorbers, pumps and the like.

One object of the invention is to replace the conventional system, comprising a calibrated nozzle or jet formed in the shape of a hole having a circular section, either for the purpose of controlling the amount of liquid or fluid in a cylinder, or for supplying or evacuating the cylinder of a shock-absorber, pump or similar apparatus by means of a valve device comprising at least two resilient segments or jaws, extensible under the pressure of the fluid and supplying the liquid to the cylinder in the form of very thin streams.

A further object of the invention is to provide a valve device having an automatically variable section, which enables the fluid to find instantaneously an optimum passage through the said device in dependence on the constantly and instantaneously varying pressure (fluid hammer effect) to which the fluid is continually subjected.

A further object of the invention is to provide a valve device which fulfils the function of a dosing or calibration device having a section which is instantaneously and automatically variable as a function of the quantity and the fineness of the stream of fluid which is to be permitted to pass under pressure, in the optimum time and at the desired instant, and in accordance with the magnitude of the impact (fluid hammer).

Still a further object of the invention is to provide a valve device carrying out the function of a dosing or calibrating device having a section which is instantaneously and automatically variable, and which is capable of acting, when so required, as a discharge valve.

The valve device is constituted by at least two elements maintained in juxtaposed relation by the least one elastic means which embraces them in such manner as to form a unit of round or polygonal shape having a flat face intended to be subjected to the action of the fluid at the highest pressure, a cavity extending across and including the junction line or lines of the said elements without passing through to the other face of said elements, and intended to permit the said fluid to pass between the elements and to force them apart as a function of its pressure.

The cavity formed in the elements may have a polygonal, round or oval section in the plane of the face subjected to the action of the fluid of the highest pressure, while at the other face, or in the proximity of said other face, it is terminated by two or more straight lips which are substantially parallel and are kept in mutual contact by the elastic means which encircle the said elements.

The cavity formed in the elements may be of parallelepiped, prismatic, cylindrical or conical shape.

The cavity formed in the elements may be formed in steps or it may have a uniformly decreasing section.

The elements may co-operate with a valve seating, against which the flat face of the said elements is applied by the pressure of a spring.

The elements may be provided on their periphery with a beaded edge extending beyond their flat face so as to be applied against a valve seating with which the elements co-operate.

The unit comprising the elements and their elastic means may be mounted in a cage.

The elastic means which maintain the elements in contact consist of one or a number of split rings, clips, or turns of wire having a round or polygonal section.

Further features of the valve device are described in more detail in the description which follows with reference to the accompanying drawings, in which:

FIG. 1 is a sectional view of a first embodiment of the valve device acording to the invention, and
FIG. 2 is a plan view thereof;
FIG. 3 is a sectional view of a second embodiment of the valve device, and
FIG. 4 is a plan view thereof;
FIG. 5 is a sectional view of a third embodiment of the valve device, and
FIG. 6 is a plan view thereof;
FIG. 7 is a sectional view of a fourth embodiment of the valve device, and
FIG. 8 is a plan view thereof;
FIG. 9 is a sectional view of a fifth embodiment of the valve device, and
FIG. 10 is a plan view thereof;
FIG. 11 is a sectional view of a sixth embodiment of the valve device, and
FIG. 12 is a plan view thereof;
FIG. 13 is a sectional view of a seventh embodiment of the valve device;
FIG. 14 is a sectional view of an eighth embodiment of the valve device, and
FIG. 15 is a plan view thereof;
FIG. 16 is a sectional view of a ninth embodiment of the valve device, and
FIG. 17 is a plan view thereof;
FIG. 18 is a sectional view of a tenth embodiment of the valve device, and
FIG. 19 is a plan view thereof;
FIG. 20 is a sectional view of an eleventh embodiment of the valve device and
FIG. 21 is a plan view thereof;
FIG. 22 is a sectional view of a twelfth embodiment of the valve device;
FIG. 23 is a bottom view of the valve device within a cage, and
FIG. 24 is a sectional view thereof;
FIG. 25 is a sectional view of the valve device resiliently mounted in a cage;
FIG. 26 is a sectional view of a modified arrangement;
FIG. 27 is a sectional view of a shock absorber comprising a valve device according to the invention; and
FIG. 28 is a cross-section of the valve device applied to an injection pump.

One of the essential member of the device forming the subject of the present invention consists of a unit comprising, as shown diagrammatically in FIGS. 1 and 2, at least two elements 1 and 1' held in mutual contact by an elastic means consisting for example of a hoop 2 which however allows both elements to move apart from each other under the thrust of a fluid under pressure or of a member which carries out the same function.

When assembled as described above, the elements 1 and 1' may form a round, oval, square, rectangular, star-shaped, castellated or like assembly, according to the application of the device and the result desired.

In the example shown in FIGS. 1 and 2, the assembly has a semicircular outer shape and comprises two circular elements 1 and 1' surrounded by a split ring 2. Over the whole or a portion of their adjacent edges, the elements 1 and 1' are cut in a bevel as at 3, 3' so as to allow the liquid or fluid under pressure, or the member used instead of this fluid, to act like a wedge and separate the parts from each other.

The dimensions of the bevelled portion and the slope of the bevel are determined according to the result desired and the force which must be employed to move the elements 1 and 1' apart from each other.

The elements may be bored at their juction or at a pre-determined point, with one or more orifices having predetermined dimensions and acting as nozzles. FIGS. 3 and 4 show an assembly similar to that of FIGS. 1 and 2, but in which such a calibrated orifice 4 is bored at its centre.

The hoop 2 may be constituted either by a split ring, as shown in FIGS. 5 and 6, or by several rings.

When it is constituted by one ring, the latter should preferably have the same height as the elements.

The thickness and height and the material used for producing the said hoop will be determined according to the force which is to cause the opening or moving apart of the elements 1 and 1', and which is exerted by a fluid or a member fulfilling the same function.

In order to increase the clamping efficiency of the elastic hoop 2 on the elements, as many split rings as required may be arranged one around the other in a suitable manner, as shown in FIGS. 7 and 8, in which there is shown a second split ring 2' embracing the normal ring 2.

The split ring 2 and the other additional ring 2' may be provided with several notches located at suitable points, in order to facilitate sliding movement between the rings and to provide a greater resiliency of these elastic elements in certain places.

The shape of the bevelled portions 3 and 3' in the elements 1 and 1' may be round, rectangular, square, etc. In the example shown in FIGS. 1 and 2, it is rectangular.

The bevels may be obtained by giving them the shape of a cone, of which the apex angle and height may vary according to the results to be obtained.

FIGS. 7 and 8 show a unit formed by the double hoop 2 and 2' and by four circular elements 1, 1', 1" and 1''', at the centre of which a conical recess is provided, forming four bevels 3, 3', 3" and 3'''.

FIG. 9 and 10 show a unit in which the elements 1 and 1' are provided at their centres with a cylindrical cavity 5, followed by two conical bevels 3 and 3'.

The elements may have a particular shape in which the bevelled portions extend below or above the plane of the elements. The latter are than formed as shown in FIGS. 11 and 12, in which the elements 1 and 1' comprise two lips 1a and 1'a, which form such an extension of the bevelled portions 3 and 3'.

As stated above, the hoop 2 may be formed by an elastic split ring of a height different from that of the elements which it embraces, or again a number of such rings may be provided. In these various cases, it will be preferable to provide said elements with a collar 8. FIG. 13 shows a unit thus constituted by split ring 2, and FIGS. 14 and 15 show a unit comprising a ring 2 having a height less than that of the elements 1 and 1'.

FIGS. 16 and 17 show a unit in which the hoop is formed by means of two split rings 2, and FIGS. 18 to 21 show two units, the hoops of which comprise respectively two and three rings 2.

The successive split rings 2 may of course be replaced by several turns of round wire or by a tape made from a material which meets the requirements set forth above.

In some cases, the elements 1 and 1' may be provided with a collar 8 at their two extremities.

The unit shown in FIGS. 16 and 17 comprises two elements 1 and 1' in which are provided bevels 3 and 3' and an aperture or port 4a, forming a calibrated linear nozzle.

FIGS. 18 and 19 show an arrangement identical with that of FIGS. 9 and 10, but having the circular nozzle 4 of the unit shown in FIGS. 3 and 4.

FIGS. 20 and 21 illustrate a unit comprising two elements 1 and 1', in which are provided successive cylindrical cavities 5a and 5 with decreasing diameters, preceding a conical cavity forming the bevels 3 and 3' which open into a circular nozzle 4.

The cavity which procedes the bevelled portions of the elements 1 and 1' may also be formed in the shape of an oval or spherical dished portion 9, as shown in FIG. 22.

Generally, the cavities, slots, ports or nozzles may be combined with the assemblies and may be given the most varied shapes, according to the results desired.

In many cases, whether the unit used comprised segments, sectors or jaws of any type, it is preferable to house the said unit in a cage 10 (FIGS 23 and 24) in the shape of a dish, the bottom of which is bored with an aperture 11 of suitable dimensions, corresponding to those of the bevelled portions and to the maximum output of the device in which the said unit is applied.

This cage 10 should be arranged so as to allow all the necessary movements and the maximum expansions of the hoop 2.

The cage 10 makes it possible to use deformable, extensible rings which can be used efficiently in the case of oval, rectangular, square, etc., elements. FIGS. 23 and 24 represent a segmentary unit housed in a cage 10 and comprising two elements 1 and 1' forming a square.

When said segmentary unit closes tightly the opening 11 of the cage 10, the same may be provided with longitudinal grooves 10a on its sides and radial grooves 10b in one or both of its faces.

In order to enable the valve device to carry out the function of discharge valve in the interior of a piston 14 (FIGS. 25) sliding in a cylinder 12, the elements 1 and 1' held together by an elastic ring 2 or other equivalent means, rest on a seating 21 formed in the said piston. The unit 1, 1' and 2 is housed inside a cage 10, against which presses a spring 18 supported against a plug 20 screwed into the body of the piston.

It will be clear that the valve device can then operate as a flow regulator for the fluid at the highest pressure, contained in the chamber 15 located above the piston, and also as a discharge valve when an abrupt over-pressure occurs in the chamber 16 situated below the piston. In this case, the spring 18 yields and the unit 1, 1', 2 is raised from its seating, the fluid then passes abruptly from the chamber 16 to the chamber 15 through the openings 22, 11 and 23, until an equilibrium has been established between the pressures inside the two chambers.

When the valve device comprises elements 1 and 1' which are provide with a collar or flange, it is this latter which may rest on the seating 21 of FIG. 26, and the operation is exactly the same.

An example of an embodiment of the device applied to a shock-absorber is shown in FIG. 27.

Inside a cylinder 12 which is closed at both ends by covers 13 and 13', a piston 14 is slidably mounted to form two chambers 15 and 15' inside the cylinder. The piston is hollow and comprises in its interior a chamber 16 which is separated from the chambers 15 and 15' by two valve devices of the type described above, and particularly such as shown in FIG. 18. Each one of the said valve devices comprises two elements 1 and 1' hooped together by two clips 2, the expansion of the device being limited by a ring 2'.

Elements 1 and 1' are of the type having collars 8, and are applied on their seats 21, formed by the central portion of the piston 14, by two cages 10 on which press two springs 18 housed in cavities 17 provided at both extremities of the piston. The spring of the lower valve unit bears on a plug 20 screwed into the lower aperture of the piston. The spring of the upper valve unit bears on a plug 20' held in the upper aperture of the piston by a clip 20a. The plugs 20 and 20' are respectively provided with conduits 22 and an aperture 22'.

In the plug 20 is screwed or fixed in any other manner, a rod 24 terminating in a ring 24a, coupled to the mechanical parts which are subjected to shocks for example. In the cover 13 is screwed a further rod 24', provided with a ring 24'a coupled to the mechanical parts which it is desired to protect against shocks, while ensuring their connection with the first parts.

A casing 24b may be arranged on the rod 24 in order to protect the latter and the system of seals contained in the cover 13', and which ensure the fluid-tight sealing of the passage of the rod through the cylinder.

At the upper portion of said cylinder, there is provided an air bell 15", the volume of which is proportional to that of the rod 24 of the piston, and which constitutes a pneumatic cushion compensating for the volume variations of the cylinder-piston assembly caused by the displacements of said rod inside the cylinder.

This air bell 15" communicates with the upper chamber 15 of the cylinder, for example by means of a valve assembly 1 and 1' held by a cage 10 and a spring 18 against its seating formed by the dished member 19 forming said bell.

The operation of the device thus constructed is as follows: When the piston 14 moves inside the cylinder 12 under the action of rod 24, towards the cover 13, for example, the fluid contained inside chamber 15 is compressed and seeks to escape. Acting as a wedge on the bevelled portions 3 and 3' of elements 1 and 1', it moves the latter apart and passes through the orifice 4 into the chamber 16 of the piston.

The spacing between the elements 1 and 1' is more or less large as the piston 14 moves more or less rapidly, and consequently varies according to the instantaneous pressure existing inside chamber 15.

As the pressure drops inside chamber 15, the elastic ring 2 closes the jaws constituted by elements 1 and 1', following this drop in pressure. When the pressure falls to zero, and when the pressure is higher inside chamber 16, the unit 1, 1', 2 and the cage 10 are lifted from their seating 21 and allow the fluid to pass so as to fill the chamber 15 again.

A converse effect is obtained on the opposite side of the cylinder 12. In this device, any one of the previously described units may be employed in any appropriate manner, and the valve unit may comprise more than two elements.

The springs 18 are chosen to have characteristics of strength appropriate to stresses involved.

The modified embodiment of the devices of the invention shown in FIG. 28 is more particularly applicable to injection pumps or spraying pumps or the like.

Inside a cylinder 33 of suitable form and dimensions is housed a piston 34 provided with a segment 34a and driven by any appropriate means.

At the bottom of the cylinder is screwed a part 10 acting as a cage to protect and ensure the free operation of a valve unit comprising elements 1 and 1' hooped together by means of a split ring 2.

The cage 10 is provided with an aperture 11 so as to allow the liquid to reach the unit 1—1'.

The bottom of the cylinder is bored and communicates with the utilisation apparatus through a conduit 35.

The cylinder is provided with a lateral conduit 36 which communicates with a pipe 37 on which is screwed the liquid inlet conduit 38. This inlet conduit is closed by a valve 39 housed in the pipe 37 and held in the closed position by a spring 40.

It will be seen that when the piston moves upwards, valve 39 closes conduit 38 and the liquid is forced back under the thrust of the piston into the conical notch of the valve assembly 1—1', on which it acts like a wedge. The elements 1 and 1' are forced apart and allow the laminated and atomised liquid to flow through the conduit 35 towards the utilisation apparatus.

The higher the pressure inside the chamber 41 formed at the bottom of the cylinder, the greater will be the space formed between the elements.

The selection of the type of valve assembly and the dimensioning of the bevelled portions in the valve unit make it possible to produce a pre-determined size of small drops of liquid. By means of the device of the present invention, it is actually possible to obtain small drops of different size, employing the same pressure.

The shape of the conduit 35 should preferably be the same as that of the bevelled portion of the elements.

The amount of liquid to be atomised at each forward movement of the piston 34 will be determined by the cross-section and the length of stroke of the piston.

Having shown and described several embodiments of my invention to illustrate the application of the principles thereof, it will be well understood that my invention may be otherwise embodied without departing from such principles and without avoiding the scope of the appended claims.

What I claim is:

1. In the combination of a pressure sensitive valve member and a hydraulic cylinder-piston type control unit the improvement comprising a cylinder, a piston movable within the cylinder and including an inner chamber, outer means acting on said piston for moving it inside the cylinder, an inlet and outlet aperture at the ends of said piston, and a valve member placed in one of said apertures for controlling the motions of the fluid between said inner chamber of the piston and the chamber in the cylinder located between the bottom of said cylinder and the lower face of the piston in which said aperture is located, said valve member consisting of a segmentary unit comprising at least two juxtaposed movable segment-like elements, and a resilient hoop holding said elements in mutual contact, a bevel in each of said elements extending at least partially diagonally on their surface, said bevels allowing the fluid to act in a suitable direction as a wedge on the segments and moving them apart for obtaining a passage, said elements comprising on their peripheries an outer annular bead rim, and an auxiliary passage extending through said piston for ensuring a communication between the two chambers separated by the piston inside the cylinder.

2. A device according to claim 1, including at least one calibrated nozzle provided in said passage for determining the rate of flow of the fluid circulating therein.

References Cited in the file of this patent

UNITED STATES PATENTS

| | | |
|---|---|---|
| 160,812 | Burr | Mar. 16, 1875 |
| 2,410,176 | Magrum | Oct. 27, 1946 |
| 2,446,571 | Browne | Aug. 10, 1948 |
| 2,537,585 | Hilkemeir | Jan. 9, 1951 |
| 2,538,375 | Montgomery | Jan. 16, 1951 |
| 2,668,603 | Winslow | Feb. 9, 1954 |
| 2,673,625 | Crabtree | Mar. 30, 1954 |
| 2,728,419 | Crabtree | Dec. 27, 1955 |
| 2,792,914 | Benard | May 21, 1957 |
| 2,928,507 | Thompson | Mar. 15, 1960 |